June 29, 1926.
A. B. COUNTS
1,590,498
AGRICULTURAL CULTIVATOR
Filed March 19, 1925    2 Sheets-Sheet 1
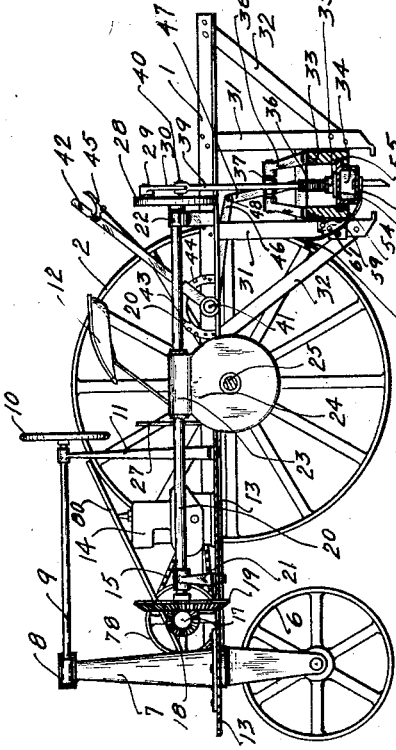
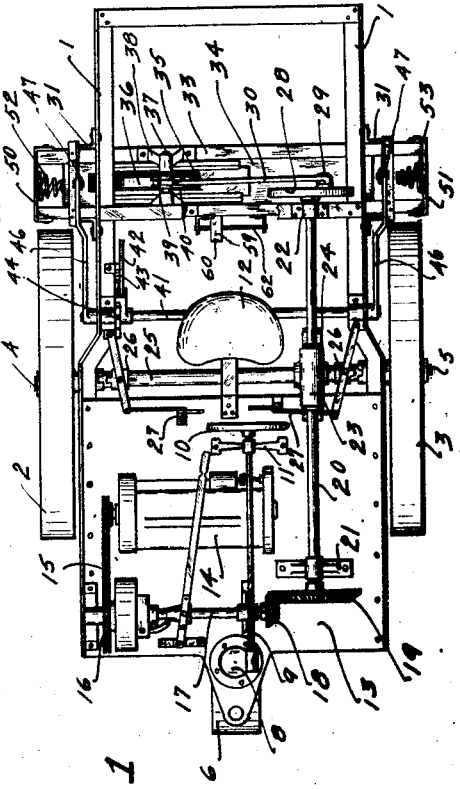
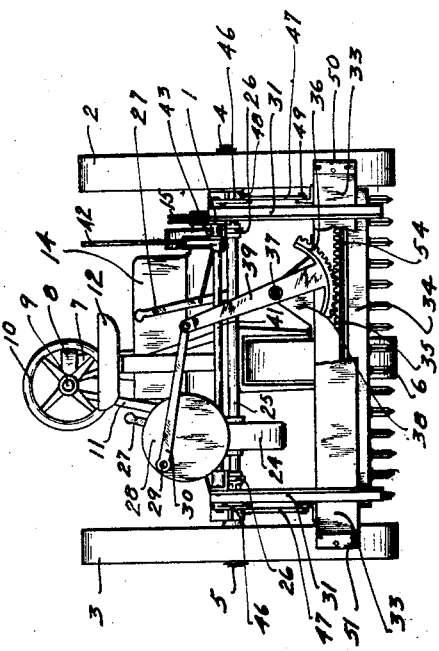
Inventor
Absalom B. Counts
By his
  Attorney June 29, 1926.
A. B. COUNTS
1,590,498
AGRICULTURAL CULTIVATOR
Filed March 19, 1925   2 Sheets-Sheet 2
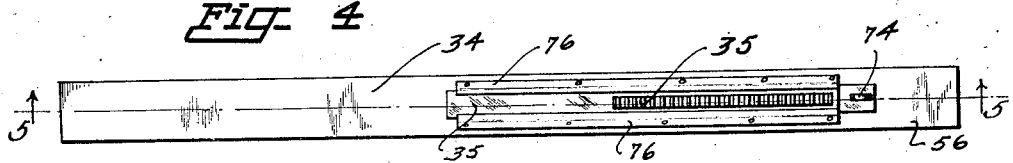
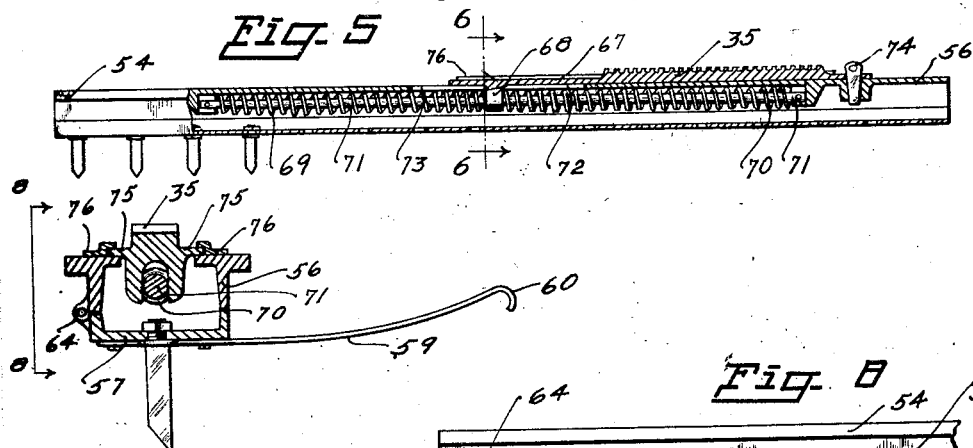
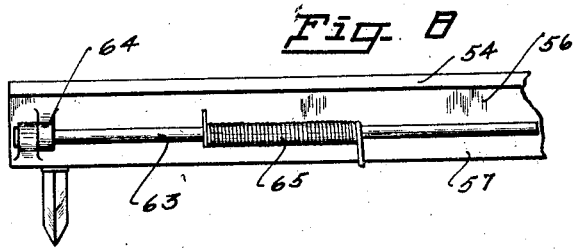
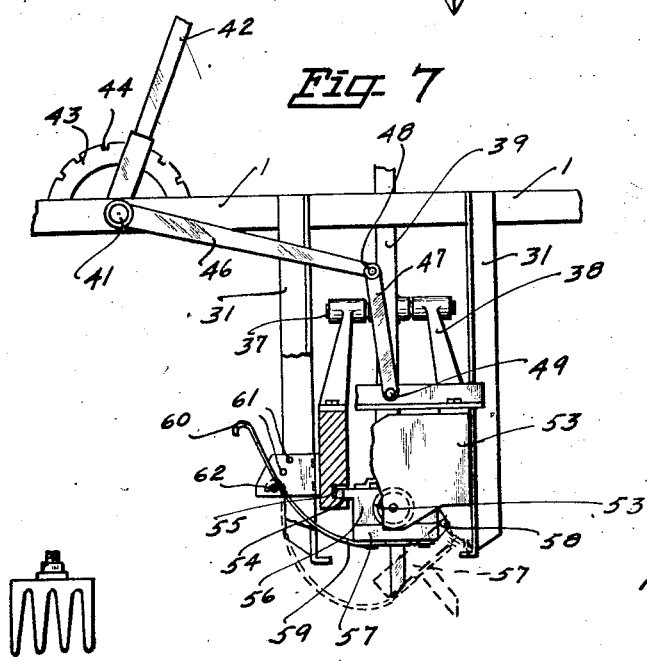
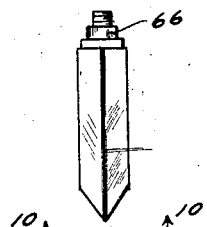
Inventor
Absalom B. Counts
By his Attorney Patented June 29, 1926.

1,590,498

UNITED STATES PATENT OFFICE.

ABSALOM B. COUNTS, OF VERNONIA, OREGON.

AGRICULTURAL CULTIVATOR.

Application filed March 19, 1925. Serial No. 16,725.

My invention relates to improvements in agricultural implements for dressing the top surface of the seed bed to form a finely pulverized surface, and is especially valuable in forming a mulch of the top surface to retain the moisture during the growing season of the crop to be planted upon the surface thus prepared.

A further object of my invention is to provide a device that may be self-propelling or drawn by an exterior force.

A further object of my invention is to provide a reciprocating head adapted to being manipulated in a reciprocating manner to thoroughly agitate the soil surface to be treated.

With these and incidental objects in view, the invention consists in certain novel features of construction and combination of parts, the essential element of which are set forth in the appended claims and to a preferred form of embodiment of which is hereinafter shown with reference to the drawings, which accompany and form a part of this specification.

Fig. 1 is an assembled plan view of my invention.

Fig. 2 is a side elevation of the mechanism shown in Fig. 1.

Fig. 3 is a rear end view of the mechanism shown in Figs. 1 and 2.

Fig. 4 is a plan view of the shuttle, or cutting knife, carrying member adapted to being reciprocated.

Fig. 5 is a side view of the mechanism shown in Fig. 4.

Fig. 6 is an enlarged sectional view of the mechanism shown in Fig. 5, taken on line 5—5, looking in the direction indicated.

Fig. 7 is a fragmentary, detached, end view of the frame structure of the machine, the suspending mechanism and guideways for the reciprocating head and the lever system adapted to raise and lower the same.

Fig. 8 is a fragmentary end view of the cutting knife carrying bar.

Fig. 9 is one form of shovel tooth adapted to being attached to the reciprocating bar.

Fig. 10 is an inverted plan view of the member shown in Fig. 9.

Fig. 11 is another preferred form of tool to be carried in the reciprocating head.

Like reference characters refer to like parts throughout the several views.

My device is preferably carried upon a structural frame 1, shown supported upon two primary wheels 2, and 3, located at either side of the frame structure, and having disposed therethrough stub axles 4 and 5. A pilot wheel 6, is disposed at the forward end of the device and is steered through a steering column 7, a gear arrangement 8, a steering column 9, and a steering wheel 10, supported through the bracket 11. To facilitate manual manipulation of the device, a seat 12, is provided at a convenient location within the mechanism.

I do not limit myself as to the means for propelling my device, as it may be self-propelled, or it may be drawn by a tractor or other draft means. In the event that it is not self-propelled, then the operating power may be obtained through proper power connection arrangements.

In a preferred form or embodiment of my mechanism I have shown a base 13, mounted forward of the transverse axis of the frame structure, having placed thereon a prime mover 14, generating a sufficient power to operate the mechanism. This power unit is connected through proper driving means, as a chain 15, to a sprocket 16, which is connected to the shaft 17, through proper operating and disconnecting clutches. A bevel gear 18, is disposed at the opposite end of the shaft 17, and engages with the main driving gear 19, secured to the shaft 20, which is properly supported and housed in the suitable bearings within the frame structure as shown at 21 and 22. A proper and adequate gear reduction mechanism, consisting of a worm gear 23, coacting with a suitable worm wheel 24, is provided. The reduction gear is properly housed to assure the same being maintained from contamination of dust or other foreign substances. The worm wheel is secured to the main shaft 25, which is properly housed within a frame structure in suitable bearings and has a suitable clutch 26, disposed upon either end of the same and is adapted to being engaged and disengaged with the stub-axles 4 and 5, supporting the primary wheels by a lever system 27. The shaft 20, terminates on its rear end with a crank disk 28, which has a wrist pin 29, disposed thereon to which is attached pitman 30.

The primary supporting wheels are made substantially large in diameter to permit of the mounting below the main frame, of a guideway 33, which is secured to the main frame by support members 31, and is held in alignment by braces 32, and supports the structural reciprocating head 34. The reciprocating head 34, has secured thereon a rack 35, and coacting with rack 35, is gear segment 36, which is oscillated about a supporting shaft 37, mounted within a bracket 38. The pitman 30 is secured to the arm 39, by pin 40, and as the crank disk 38 is rotated, a reciprocating movement is imparted to the head.

When necessary or desirable, the guideway may be raised or lowered, and to accomplish this I have provided a crank shaft 41, secured to the main frame and operated by lever 42. The lever 42, is held in a locked position by a detent, operated by lever 45, entering the notches 44, of the detent quadrant 43. The support members 31 act as guideways and permit the raising and lowering of the guideway 33 therealong, through the action of the bell crank 46, connected by the link 47, and the pins 48 and 49, to the guideway 33; and vertical guideways upon the guideway 33 in slidable contact with the supporting members 31, prevent the main frame from being actuated as the guideway 33, is raised and lowered.

Because of the rapidity of the movement of the head carrying the bar to which the cutter teeth are secured, I have found it necessary to cushion the movement of the head at the end of each stroke. To accomplish this I have provided the cushioning heads 50 and 51, disposed in the path of travel of the head, the same being secured to the suspended guideway, and has suitable cushioning means, as springs 52 and 53, secured thereto, to absorb the shock generated in the reciprocating head, at the end of each stroke.

Disposed upon the sides and transversely of the reciprocating head are guide strips 54, actuated within the guide slots 55. The reciprocating head is preferably made of two main members, an upper 56, and a lower member 57, and having hinged connection therebetween as shown at 58. The primary object of this hinged relationship is to permit of a hinging down of the lower or cutter tooth carrying member 57, in the event of the same having contacted with an obstruction in its line of travel, as shown in the dotted position of Fig. 7. Secured to the lower member 57, by suitable fastening means, as bolts, is spring 59, terminating upon its upper end in a hook 60. Locating holes 61, are disposed within the supporting frame to which is attached pin 62, disposed in the line of travel of the spring 59, so that the hook end of 60, will contact with the pin and limit the amount of hinging down action of the lower member 57. To return the member 57, to normal closed position, I have placed transversely of the same a rod 63, supported in suitable bearings 64, and having a substantial spring 65, thereupon to maintain the member 57, in closed condition, excepting when a substantial obstruction, as a stump or stone or other foreign fixed object is met, at which time the hinging down action will occur to permit of the passing over of the same.

The tooth carrying lower member 57, has openings therethrough to permit of the location of the cutter teeth, and fastenings, such as threaded nuts, maintain the same in desired position within the lower member. This is best shown in Fig. 5. The upper end of the cutter teeth have a shoulder member 66, disposed thereupon of a suitable shape to fit into the openings within the lower member 57, to properly locate the same and to maintain the same in desired position.

Because of the nature of the work to be done it is quite essential that some means of automatically stopping the reciprocating movement of the head be provided in the event that an obstruction should be met, or that the tooth carrying bar should in any way become clogged. To accomplish this, I have placed within the reciprocating head a cushioning compensator to compensate for the equivalent of the length of stroke of the reciprocating head. The rack 35 is carried upon the reciprocating head, but is not rigidly secured thereto, and the same has an elongated end 67, disposed below the same. Passing transversely of the reciprocating head is a shaft 71, which passes through the lug 68, on the underside of the elongated end. Around the shaft 71, are two compression coil springs, 69 and 70, which are placed within the head under pressure and which react against the lug 68. The lug 68, passes through a slot in the upper side of the reciprocating head which is shown at 72 and 73, disposed at either side of the lug. As the reciprocating head is shunted from one side to the other, and no obstruction is met, the springs 69 and 70, having an equal pressure, maintain a balanced condition. In the event, that an obstruction is met, in the part of the reciprocating head, the spring is compressed and no movement of the head occurs, though the remainder of the driving mechanism continues to operate. Under certain conditions it may be found desirable to operate without these springs functioning, in which event, a key 74 is placed in position, as shown at 74, so that a locked condition will prevail between the rack 35 and the reciprocating head. The rack 35, carries guide strips 75, on either side of the same which are made to operate within the guideway 76. Where the mechanism is to be drawn by animal or tractor draft, a draw bar may be attached to the eye 77, secured to the forward end of the frame structure. In the event that a tractor is to be used for furnishing power for the operation and pulling of the mechanism the draw bar may be attached to the eye 77, and a suitable hook up as a chain or belt, be applied to the pulley or sprocket 78, for furnishing operating power for manipulating the reciprocating head. A friction clutch 79 is supplied to the pulley or sprocket shaft 17, where this form of operation is used. In which event a suitable clutch lever 80 is used.

Where the soil to be cultivated is finely pulverized and the treatment is one to prevent the hardening of the top surface and the destruction of weeds, I prefer to use a cultivating tool, as shown in Fig. 11, wherein the teeth are fine and a fine top surface will result. The cultivator, as shown in Fig. 11, may be maintained in a fixed position at any angle to the line of travel of the cultivator.

A shovel type of cutter tooth may be found most desirable where a cultivation of substantial depth is to be made. The shovel type of tooth is shown in Fig. 9, and Fig. 10, and is also adapted to being placed and maintained at any desired angle to properly cultivate the soil. This form of tooth is especially desirable where a soddy or weedy soil is encountered, especially as it is sharp on the edges and will cut as well as cultivate.

The two forms of cultivator teeth here shown are made to illustrate the application and I do not wish to be limited to this form of teeth as it will be apparent that various and different forms of teeth may be utilized.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. An agricultural cultivator, comprising a structural frame mounted upon two primary wheels and a pilot wheel, a guideway mounted below the main frame, a head maintained within said guideway, means whereby a reciprocating motion may be imparted to said head within the guideway, said means comprising a rack, a pivotally mounted gear segment, a pitman and a crank disk mounted upon a rotatable shaft; and cutter teeth disposed upon the lower side of said head.

2. An agricultural cultivator comprising a structural frame mounted upon two primary wheels and a pilot wheel, a guideway mounted below said main frame, a reciprocable head maintained within the guideway, a means to raise and lower the guideway, said means comprising a shaft rotated by a lever, a bell crank secured to the shaft, and a link connecting the bell crank with the guideway; a means to impart a reciprocating movement to the head within the guideway, said means consisting of a rack secured to the head, a pivotally mounted gear segment coacting with said rack, a crank disk mounted on a rotatable shaft, and a pitman connecting the crank disk with the arm of the gear segment; and a clutch to connect and disconnect the reciprocating means with a source of power.

3. An agricultural cultivator, comprising a main wheeled frame, a guideway disposed below the main frame, vertical guides disposed within guideway support members, means to raise and lower the guideway within the vertical guides, said means comprising a shaft rotated by a lever, a bell crank secured to the shaft, and a link connecting the bell crank with the guideway; a head slidably mounted within the guideway, the lower portion of the head held in hinged relationship with the upper portion of the head, means to limit the hinging movement of the lower portion of the head, and to maintain the same in a normal position, comprising a rod mounted on the guideway and parallel to the movement of the head, and a spring member having one end secured to the lower hinged portion of the head, a hook formed at the other end thereof and slidably contacting with said rod; and cutter teeth disposed upon the lower side of the lower hinged member.

4. An agricultural cultivator, comprising a main wheeled frame, a guideway mounted below the main frame, a reciprocable toothed head mounted within the guideway, springs disposed in the line of movement of the toothed head, at the ends of the guideway, to absorb the shock of the reciprocating movement of the head, means disposed within the frame structure to raise and lower the guideway and means to reciprocate the head, said means consisting of a rack mounted upon the head, a gear segment coacting therewith, a crank disk mounted upon a shaft, a pitman connecting said crank disk with an arm of the gear segment, and a clutch to engage and disengage said shaft with the source of power.

5. An agricultural cultivator, comprising a main wheeled frame, a suspended guideway, a head reciprocably mounted within the guideway, shock absorbing cushions disposed in the path of the head, a toothed hinged member disposed upon the lower side of the head, means to limit the hinging movement of the hinged tooth member and to maintain the same in a normal position, comprising a rod mounted on the guideway and parallel to the movement of the head, and a spring member having one end secured to the hinged tooth member, and having a hook formed at the other end thereof and slidably contacting with said rod; and a lever system to raise and lower the guideway.

ABSALOM B. COUNTS.